United States Patent Office 3,022,649
Patented Feb. 27, 1962

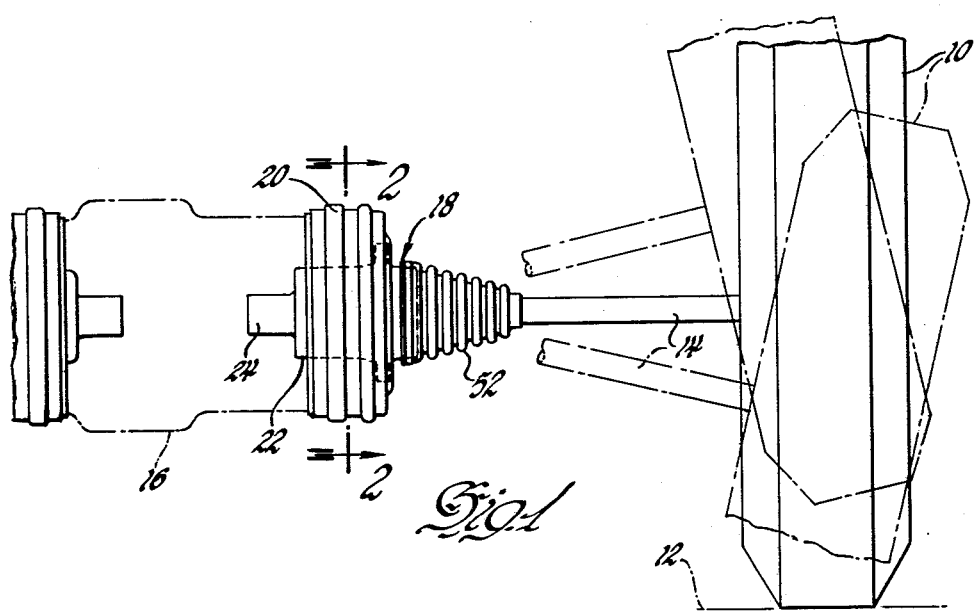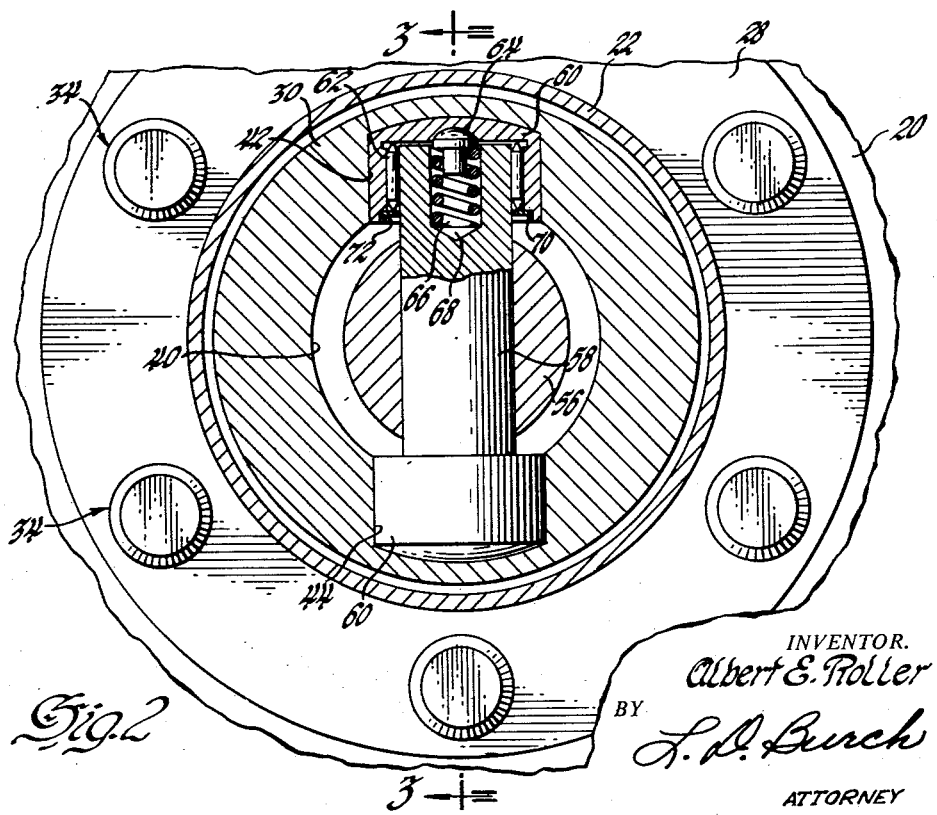

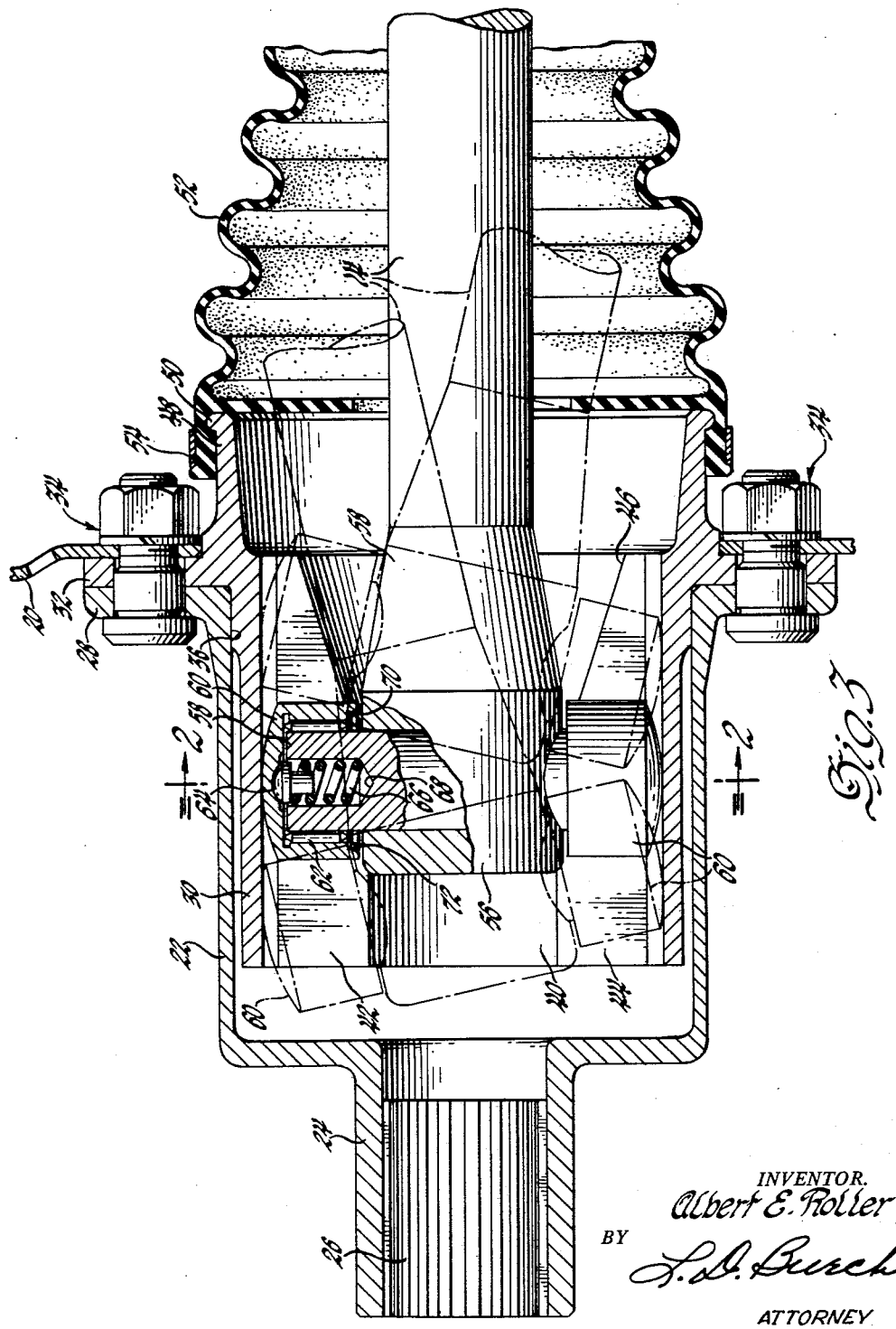

3,022,649
UNIVERSAL JOINT
Albert Emil Roller, Birmingham, Mich., assignor to General Motors Corporation, Detroit, Mich., a corporation of Delaware
Filed Aug. 25, 1959, Ser. No. 835,908
2 Claims. (Cl. 64—8)

This invention relates to universal joints and more particularly to a pot type universal joint for use in a swing axle type motor vehicle suspension.

In the swing axle type of motor vehicle suspension, the rear wheels of the vehicle are mounted on half axle shafts that extend between the road wheel and the vehicle differential unit. A universal joint is generally provided between the half axle shaft and the differential unit, in order to compensate for up and down movement of the vehicle wheel with respect to the rest of the motor vehicle.

In universal joints used for this purpose, it is important that the structure of the joint be such as to adequately support the half axle and the wheel, and still be small enough to provide an economical means of torque transmission. The usual universal joint is constructed of a housing, or pot member, having several axial bores formed therethrough to receive the axle shaft, and a trunnion and bearing assembly secured in the end of the axle shaft. With a construction of this kind, three blind boring operations are required in order to machine the bearing surfaces within the pot member. Blind boring operations are tedious and expensive.

The device in which this invention is embodied comprises generally a universal joint of suitable strength and adequate construction to support the vehicle half axle and the road wheel. The universal joint utilizes a housing receiving a pot member, the pot member being open at both ends to simplify the machining operations. The pot member may be formed from a forging or rough casting, and a simple broaching operation is all that is necessary in order to finish the bearing surfaces. This obviously cuts down the expenses and the amount of time consumed in manufacturing a pot type universal joint.

These and other advantages will become more apparent from the following description and drawings in which:

FIGURE 1 is a schematic view of a motor vehicle final drive illustrating the location of the various parts.

FIGURE 2 is a cross-sectional view of a portion of the structure illustrated in FIGURE 1 with parts broken away and in section to illustrate the universal joint, taken substantially along the line 2—2 of FIGURE 1 and looking in the direction of the arrows.

FIGURE 3 is a cross-sectional view of the universal joint illustrated in FIGURE 2, taken substantially along the line 3—3 of FIGURE 2 and looking in the direction of the arrows.

Referring more particularly to the drawings, FIGURE 1 shows a motor vehicle road wheel 10 which is operable on a road surface, or the like, 12 and mounted on a half axle shaft 14. The half axle shaft extends between the wheel 10 and a differential unit 16, or the like, with a universal joint, illustrated generally by the numeral 18, disposed between the axle shaft and the differential unit. The universal joint 18 may also support an inboard brake drum 20, or the like, the joint being of sufficient strength and rigidity to adequately support the structure.

The construction of the universal joint is best shown in FIGURES 2 and 3. A housing member 22, generally cylindrical in shape, is located adjacent the differential unit 16. The housing has an extension 24 formed from the inboard end thereof, to receive a shaft or the like (not shown) extending from the differential gears in the differential unit 16. An internal spline 26 may be provided in the extension 24 to give a positive torque transmitting connection between the drive means in the differential 16 and the axle shaft 14. A flange 28 is formed on the opposite end of the housing 22, being annular in shape and extending radially outwardly from the body of the housing 22.

A universal joint pot member 30 is received within the open end of the housing 22, the pot 30 having an external annular flange 32 formed thereon, and intermediate the ends thereof. The flange 32 abuts the flange 28 formed in the housing 22. A plurality of nut and bolt members, illustrated generally by the numeral 34, secure the flanges 28 and 38 together, in order to rigidly secure the pot member 30 to the housing 22. The inboard brake member 20 is also secured to the flange connection by the nut and bolt members 34. An annular land 36 is formed on the outer surface of the pot member 30 to locate and properly space the pot member 30 within the cylindrical opening 38 of the housing 22.

The pot member 30 is provided with three axial apertures 40, 42 and 44 respectively, aperture 40 being centrally disposed within the pot member. The apertures 42 and 44 are generally rectangular in cross section and are connected to the central aperture 40, for reasons to be hereinafter described. The apertures 42 and 40 terminate in an inclined conical cavity 46 formed in the outboard end of the pot member, for reasons also to be hereafter described.

A cylindrical extension 48 is formed on the outboard end of the pot member 30 and has an external annular bead 50 formed at the extreme end thereof. A corrugated rubber boot 52 is received over the extension 48 of the pot member 30 and retained thereon by a suitable retaining ring 54. The opposite end of the boot 52 surrounds the axle shaft 14, to prevent the entrance of dirt, water and other foreign materials to the interior of the universal joint.

The axle shaft 14 extends into the pot member, and into the central aperture 40 formed thereon. The end 56 of the axle shaft 14 is a portion of increased diameter, with respect to the remainder of the axle shaft 14, the increase being effected by the conical section 58. A trunnion and bearing assembly is secured in the end of the axle shaft within the pot member, and extends into the apertures 42 and 44 communicating with the central aperture 40.

The trunnion and bearing assembly comprises, generally, a trunnion or cross shaft 58 passing through the enlarged portion 56 of the axle shaft 14 and extending into the apertures 42 and 44. A pair of bearing caps 60, one at each end of the cross shaft 58, of substantially the same cross-sectional configuration as the apertures 42 and 44, slide or roll within the apertures 42 and 44. An annulus of needle bearings 62 are disposed between the cross shaft 58 and the interior of the bearing cap 60 in order to allow relatively frictionless rotation of the bearing cap 60 about the cross shaft 58 during its movement in the aperture 42 or 44.

In order to bias the bearing cap 60 in a radially outward direction, a thrust button 64 abuts the interior of the bearing cap 60 and is forced outwardly by a spring 66. The spring 66 is received in an axial opening 68 formed in the end of the cross shaft 58. A retaining ring 70, received in an annular groove 72 formed in the inward end of the bearing cap 60, retains the annulus of needle bearings 62 within the bearing cap.

Universal movement of the axle shaft 14 with respect to the housing 22 is provided by the axial and angular motion of the trunnion and bearing assembly, and consequently the axle shaft, relative to the pot member 30 and the housing 22. The axle shaft 14 is allowed angular clearance by the conical chamber 46 and the conical section 58, allowing movement of the axle shaft in an angular direction. The upward and downward positions of the axle shaft and trunnion and bearing assembly are illustrated in dashed and dotted lines in FIGURE 3.

Thus, it may be seen that a suitably strong and simply constructed universal joint is provided for use with a swing axle type vehicle suspension. It is easily seen that the pot member 30, being open at both ends, requires only a simple broaching operation in order to finish the bearing surfaces for the bearing caps, resulting in a maximum of efficiency with a minimum of expense.

What is claimed:

1. A universal joint for a motor vehicle axle comprising said axle, a trunnion and bearing assembly secured in the end of said axle, a pot member open at both ends received about said end of said axle and said trunnion and bearing assembly, a cylindrical housing receiving said pot member and secured thereto and closing one end of said pot member, and an extension formed on said housing for connecting said housing to a final drive means, said trunnion and bearing assembly and said axle shaft being axially and angularly movable within said pot member for providing universal motion therebetween.

2. A universal joint for a motor vehicle rear axle comprising a cylindrical housing having an open end, an extension formed on the other end of said housing and having means for connecting said housing to a vehicle driving means, said open end of said housing having an external annular flange extending therefrom, a pot member received within said housing and coaxial therewith and being open at both ends, an external annular flange formed on said pot member and intermediate the ends thereof and engaging said flange formed on said housing for securing said housing and said pot together, said pot member having three longitudinal bores formed therethrough, two of said bores communicating with the third of said bores, an axle shaft extending into said pot member and into the third of said bores, and a trunnion and bearing assembly secured in the end of said axle shaft within said pot member and extending into said two of said bores, said axle shaft and said trunnion and bearing assembly being axially and angularly movable within said pot member for providing universal movement of said axle shaft with respect to said housing and the rest of the vehicle drive means.

References Cited in the file of this patent

UNITED STATES PATENTS

| | | |
|---|---|---|
| 1,943,814 | Cutting | Jan. 16, 1934 |
| 1,987,678 | Goddard | Jan. 15, 1935 |
| 2,716,461 | MacPherson | Aug. 30, 1955 |
| 2,898,750 | De Lorean | Aug. 11, 1959 |
| 2,926,510 | De Lorean | Mar. 1, 1960 |